Figure 1:
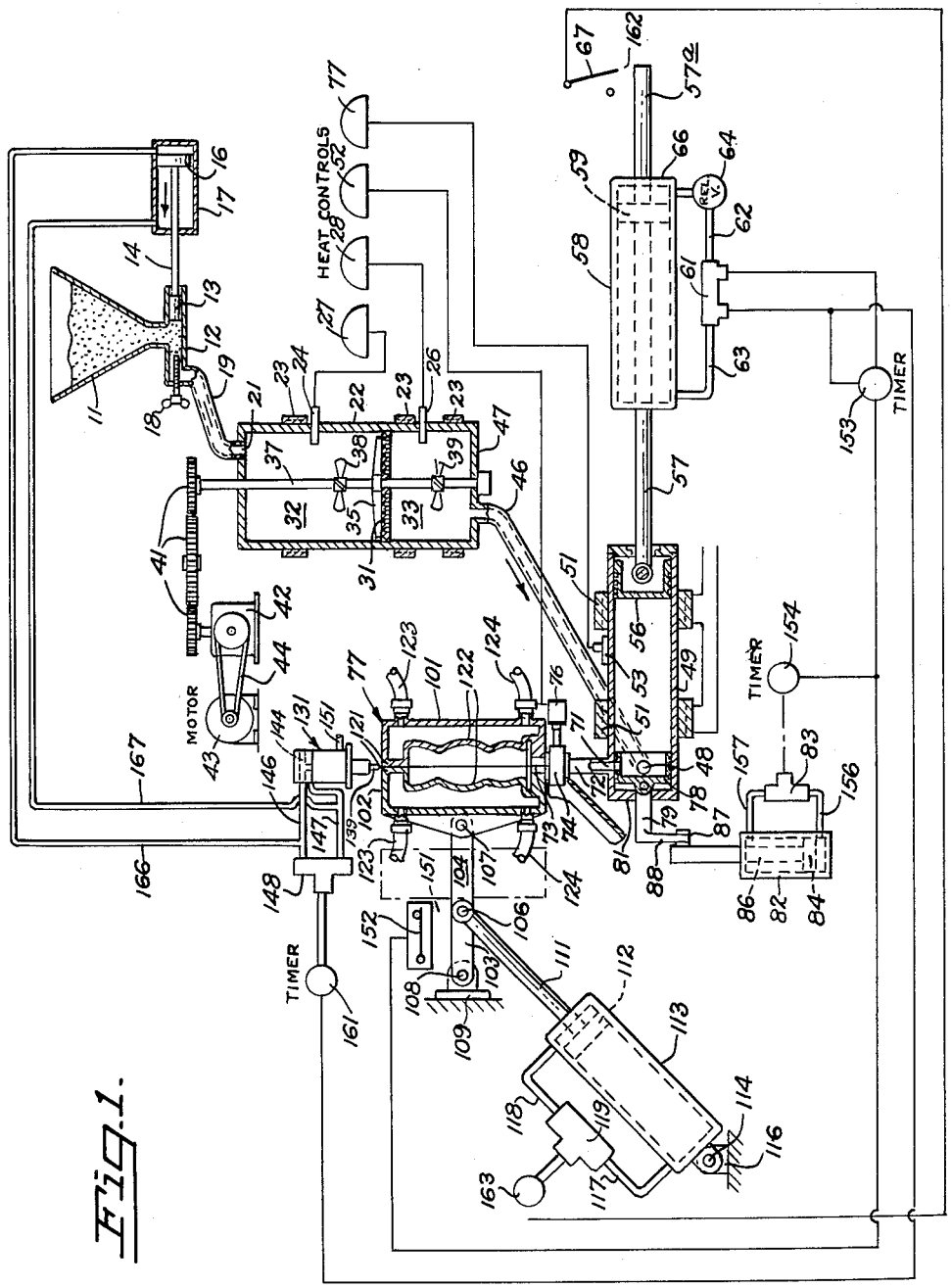

Nov. 21, 1961  R. E. POLETE  3,009,203
METHOD FOR INJECTION MOLDING HOLLOW PLASTIC ARTICLES
Filed March 31, 1958  2 Sheets-Sheet 1

INVENTOR.
ROBERT E. POLETE
BY
Townsend and Townsend
ATTORNEYS.

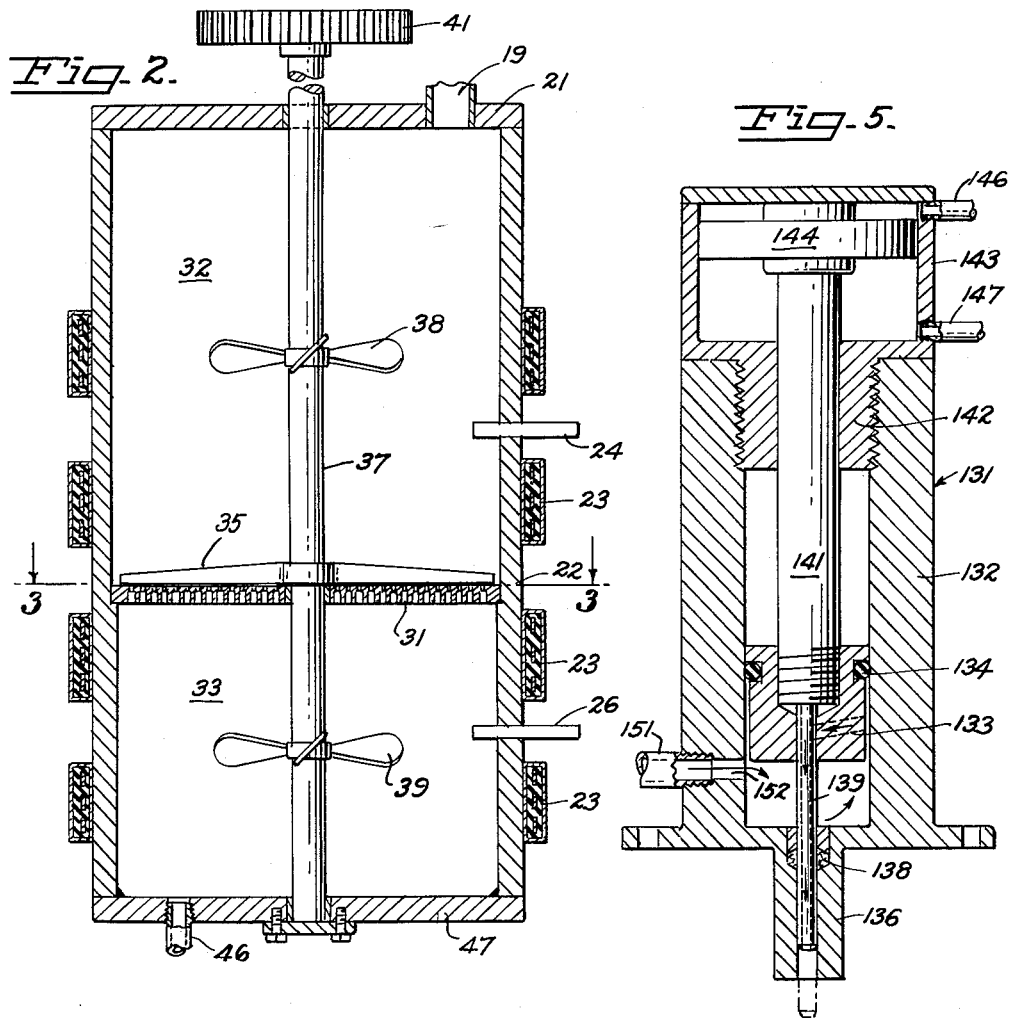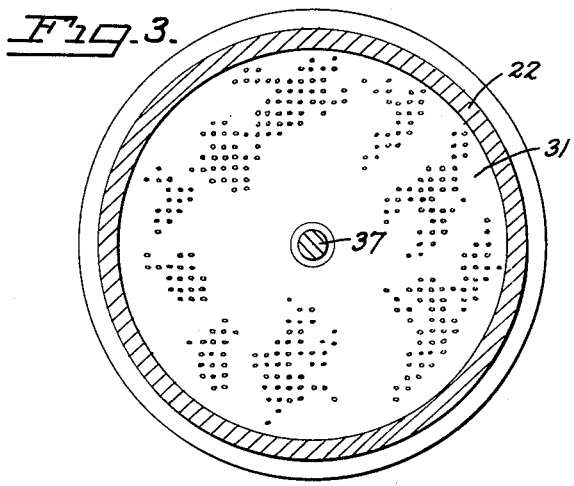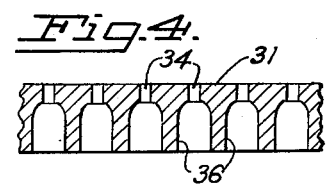

United States Patent Office 3,009,203
Patented Nov. 21, 1961

3,009,203
METHOD FOR INJECTION MOLDING HOLLOW PLASTIC ARTICLES
Robert E. Polete, St. Louis, Mo., assignor to Gerber Products Company, Fremont, Mich., a corporation of Michigan
Filed Mar. 31, 1958, Ser. No. 725,136
7 Claims. (Cl. 18—30)

This invention relates to a new and improved apparatus and method for injection molding hollow plastic articles, and is characterized by the fact that no cores are required for the cavity in the article being molded.

The present invention has application in the molding of small objects of polyethylene, although it will be understood that other objects and other plastic materials may be employed. Pellets of plastic are plasticized under heated conditions and the fluid plastic is maintained at an elevated temperature until it is injected into a chilled mold. A measured charge of plastic material is injected into the mold and maintained in the mold for a sufficient time interval for the skin of the object to solidify by reason of the relatively low temperature of the mold. After the skin of the object has solidified, a measured quantity of the remaining fluid plastic is withdrawn by vacuum, thereby creating a void or cavity in the interior. The material is not discarded but is employed in the next object to be molded. At the same time that the excess fluid plastic is being withdrawn, compressed air or other compressed fluid is injected into the cavity to prevent collapse of the molded object and to assist in withdrawing the excess plastic.

Accordingly, it is a principal purpose and object of the present invention to provide a method and apparatus whereby, under carefully controlled conditions, a measured quantity of heated plastic is injected into a mold, the mold being preferably maintained at a reduced temperature, and thereafter a portion of the fluid plastic is withdrawn, providing a cavity in the molded object without the use of cores or other conventional devices employed in molding hollow objects, the withdrawn portion being reinjected when the next charge is forced into the mold.

The present invention therefore enables the user to mold in one piece hollow objects which are intricately shaped.

Further features of the invention relate to the apparatus for automatically metering a predetermined amount of plastic material into a feed chamber and thence into the mold—all by the use of control equipment such as timers, switches, valves and pressure regulators hereinafter described in detail.

A still further feature of the invention is the provision of apparatus for automatically metering the withdrawal of a predetermined amount of material from the interior of the object being molded, means being provided to insure the accuracy of such withdrawal of excess material.

A still further object of the invention is the introduction of air under pressure into the mold through a control valve during the time that the excess plastic material is being removed from the mold. The introduction of air in this manner assists in evacuating the excess plastic material from the mold, in preventing the walls of the molded article from collapsing due to vacuum, and in cooling the mold and the molded object.

Other objects of the present invention will become apparent upon reading the following specification and referring to the accompanying drawings in which similar characters of reference represent corresponding parts in each of the several views.

In the drawings:
FIG. 1 is a schematic view of the apparatus employed in accordance with this invention, some of the parts being broken away in section;
FIG. 2 is an enlarged vertical sectional view through the plasticizing chamber;
FIG. 3 is a horizontal sectional view taken substantially along the line 3—3 of FIG. 2;
FIG. 4 is an enlarged vertical sectional view of the breaker plate of the plasticizing chamber;
FIG. 5 is a vertical sectional view through the air injection nozzle.

The present invention is adapted to the injection-molding of plastic materials. One plastic material which may be employed in connection with the present invention is polyethylene. A typical formulation of molding compound is as follows:

| Percent of compound | Material | Designation | Manufacturer |
|---|---|---|---|
| 5-50 | A.C. polyethylene | Grade 6S | Allied Chemical Corp. |
| 50-95 | Polyethylene | DYLT | Bakelite Company. |

Pellets of the mixture of plastic material are deposited in a hopper 11 which discharges into a metering chamber 12 in which reciprocates metering piston 13. Piston 13 is connected by rod 14 with pneumatic piston 16 in air cylinder 17. By valve mechanism hereinafter described in detail, air is alternately admitted to opposite ends of cylinder 17 and this results in reciprocation of piston 13. The stroke of piston 13 is adjusted by means of an adjustment screw 18 threaded into one end of metering chamber 12, which limits the forward movement of piston 13. Metering chamber 12 discharges through conduit 19 into the upper end 21 of plasticizing or heating chamber 22. Chamber 22 is heated by means of electrical band heaters 23 around the circumference thereof, the current of heaters 23 being controlled by thermocouples 24 and 26 and heat controls 27 and 28, respectively, which maintain the internal temperature of chamber 22 at a desired level. Chamber 22 may, if desired, be internally compartmented by means of a horizontally disposed breaker plate 31 which divides the interior of the chamber 22 into an upper section 32 and a lower section 33, but the use of breaker plate 31 may be eliminated in many installations. The breaker plate tends to prevent separation of wax and plastic. Breaker plate 31, shown in detail in FIG. 4, may be fabricated with small-diameter holes 34 in its top surface communicating with large-diameter holes 36 in its bottom surface. The plastic cylinders are forced through the small-diameter holes 34, which breaks them into particles of predetermined maximum size, and hence insures proper mixing of the pellets and homogeneous heating thereof. To assist in mixing the cylinders and in forcing them downwardly through the plasticizing chamber 22, there is disposed centrally in chamber 22 a stirring shaft 37 having a plurality of stirring blades 38 in the upper chamber 32 and similar blades 39 in the lower chamber 33. In addition, a doctor blade 35 scrapes material from the top surface of the plate 31. Shaft 37 is driven by means of gear train 41, reduction gear 42, motor 43 and belt 44, as is clearly shown in FIG. 1. The heated and plasticized material is discharged from the lower portion 33 of plasticizing chamber 22 through a conduit 46 which leads from the bottom end 47 of chamber 22 to a port 48 in one end of feed chamber 49. Feed chamber 49 is likewise maintained in a heated condition by means of band heaters 51. Current through heaters 51 is controlled by heat control 97, which in turn is regulated by a thermocouple 53 on feed chamber 49. Reciprocable in the chamber 49 is a piston 56 connected by rod 57 to air cylinder 58, which contains a piston 59 on rod 57. Compressed air is introduced in opposite ends of cylinder 58 by means of solenoid-actuated air valve 61 and conduits 62 and 63 leading to the forward and reverse stroke sides of the cylinder 58, respectively. A pressure relief valve 64 is installed in conduit 62 and causes stoppage of reciprocation of pistons 59 and 56 when a predetermined pressure is reached. Rod 57 extends through the end 66 of cylinder 58, the extension 57a beyond end 66 contacting switch arm 67, as hereinafter set forth in greater detail. Thus, valve 61 controls the reciprocation of piston 59 and in turn the reciprocation of piston 56, and the forward stroke of piston 56 is terminated when the pressure exceeds a predetermined amount. Cylinder 49 is provided with a second port 71 in registry with conduit 72 which leads to nozzle 73 heated by band heater 74, the temperature being controlled by thermocouple 76 and heat control 52. Nozzle 73 communicates with the interior of mold 77, the details of which are hereinafter set forth. Within feed cylinder 49 is a cylindrical valve 78 which is controlled by valve rod 79 extending out through the head 81 of the cylinder 49. Valve rod 79 is controlled by means of pneumatic cylinder 82 and solenoid-controlled pneumatic valve 83 in the following manner: Within cylinder 82 is piston 94 having rod 86 extending out through an end of cylinder 82. Rod 86 is connected by pin 87 to crank arm 88 on rod 79. As piston 84 reciprocates, valve 78 oscillates. Valve 78 has ports located so that communication may be established between cylinder 49 and ports 48 and 71 alternately.

The operation of valve 78 is such that, when the valve is in one position and when piston 56 is on its return stroke (i.e., moving toward the right as shown in FIG. 1), fluid plastic is drawn down through conduit 46 from plasticizer chamber 22 and into the feed cylinder 49. On the forward stroke of piston 56, valve 78 is so turned that port 48 is closed and port 71 opened, causing discharge of plastic from the chamber 49 through conduit 72 and thence through nozzle 73 into mold 77. On the evacuation stroke of the piston 56, excess plastic is drawn out of the mold 77 through nozzle 73 and conduit 72 and back into feed chamber 49.

Mold 77 consists of a stationary part 101 and a movable part 102. Part 102 is caused to reciprocate in a horizontal path by means of ways (not shown), and the reciprocation is caused by a toggle arm consisting of two pieces 103 and 104 pivotally connected together by pivot 106. Toggle arm portion 104 is pivoted by means of pivot 107 to movable part 102. The end of arm 103 opposite pivot 106 is pivotally connected by means of pivot 108 to a stationary support 109. Connecting rod 111 is likewise pivoted to pivot 106, and the opposite end of rod 111 carries piston 112 inside mold-closing cylinder 113. Cylinder 113 is pivoted by pivot 114 to stationary support 116. Compressed air is alternately admitted to opposite ends of cylinder 113 through conduits 117 and 118 leading from solenoid-controlled valve 119. Reciprocation of piston 112 causes the mold half 102 to move toward and away from the stationary mold half 101.

Each of the mold halves 101 and 102 has a meeting face 121 in which is formed a mold depression 122, the shape of which is determined by the nature of the object being molded. The interior of the mold is cooled by means of hoses 123, 124 which circulate cold water through the mold to chill the same.

Associated with the mold 77 is compressed air-injection nozzle 131 shown in detail in FIG. 5. Nozzle 131 has a cylinder 132 in which reciprocates a piston 133 having an O-ring 134 disposed in a groove near the upper end of piston 133 and sealing against the interior wall of the cylinder 132. Below ring 134 piston 133 fits loosely in cylinder 132. On the bottom of cylinder 132 is a sleeve 136 which communicates with the mold 77, and slidable within sleeve 136 is a tapered needle 139, there being a packing gland 138 sealing against needle 139. Needle 139 is connected to piston 133. On the upper end of piston 133 is a connecting rod 141 which extends up through the head 142 at the top of cylinder 132. Head 142 has a compressed air control cylinder 143 at its upper end, in which is disposed compressed air piston 144 on the upper end of connecting rod 141. Compressed air is admitted alternately to the ends of cylinder 143 through ducts 146, 147 leading to solenoid-controlled compressed air valve 148, hereinafter described in detail. When the piston 144 is raised, needle 139 is raised and, when the piston 144 is depressed, the lower end of needle 139 penetrates into the object in the mold 77. A source of compressed air communicates through conduit 151 and port 152 in the lower end of cylinder 132 and from there through aperture 130 into the interior of hollow needle 139. Thus, when piston 133 is raised in the position shown in FIG. 5, compressed air from conduit 151 may be injected into the article being molded, the loose fit between piston 133 and cylinder 132 permitting flow of air into hollow needle 139. The flow of air through needle 139 is controlled by valve 148.

The operation of the apparatus is as follows: At the commencement of a cycle, valve 119 admits compressed air through conduit 117 to the lower end of cylinder 113, and this causes piston 112 to close the mold half 102. Arms 103 and 104, which control the closing of the mold, contact switch arm 151 of switch 152. Switch 152 energizes electrical control timer 153 and valve timer 154 which shift solenoid valves 61 and 83, respectively. Valve 83 controls the admission of compressed air from a source (not shown) through conduits 156, 157 leading to cylinder 82, and this causes piston 84 to shift valve 78 in cylinder 49 so that material may be forced into the mold 77 through conduit 72. At the same time, valve 61 causes compressed air to pass from a source (not shown) through conduit 62 to the right end of cylinder 58, and this causes piston 59 to move to the left, which motion is in turn transmitted to piston 56. Plastic material, which has filled the cylinder 49, is pushed by piston 56 into the mold 77. When the pressure on the material in the mold 77 becomes equal to the pressure applied by cylinder 58, as determined by pressure regulator 64, piston 59 stops and maintains constant pressure on the material until the first stage of timer 153 times out. When the first stage of timer 153 times out, expulsion timer 161 and the second stage of timer 153 are activated. Valves 61 and 148 are shifted. This causes piston 59 to return to the dotted-line position shown in FIG. 1, while piston 144 moves downward to introduce air under pressure through air valve 131 into the cavity in the mold 77. When the second stage of timer 153 times out, the third stage of timer 153 is activated and valve 61 shifts to neutral. This causes pistons 59 and 56 to stop. Timers 154, 161 and the third stage of timer 153 time out simultaneously. Pistons 59 and 56 thereupon continue their return stroke, whereas air valve 131 closes, shutting off the air supply to the mold, while at the same time piston 84 moves to shift valve 78 to allow material to be drawn from the chamber of plasticizer 22 into cylinder 49 through conduit 46. When pistons 59 and 56 complete their return stroke, switch arm 162 of switch 67 activates hold timer 163. This causes a shifting of valve 119 and thereupon the piston 112 opens the mold and the part molded therein is ejected. When timer 163 times out, valve 119 is again shifted, thereby closing the mold and activating switch 152 to repeat the cycle.

Timer 161 and valve 148 control the admission of compressed air to cylinder 117 through conduits 166, 167 so that a metered amount of plastic pellets is removed from hopper 11 into plasticizer chamber 22 through conduit 19, thereby maintaining a constant level of plastic material in chamber 22. Adjustment screw 118 assures this constant supply.

The effect of the foregoing described mechanism and control therefor is, that plastic material drawn from plasticizer chamber 22 into cylinder 49 is forced on the forward motion of piston 56 through the nozzle 73 into the mold 77, valve 78 controlling such admission and shutting off communication with plasticizer chamber 22. By reason of the chilled condition of the mold 77 as the cooling water circulates through pipes 123 and 124, a thin skin of plastic solidifies at the surface of mold cavity 122. However, the plastic in the interior of the mold is not solidified. Thereupon, piston 56 is retracted, which draws fluid plastic material from the mold 77 by suction back into feed chamber 40 so that it may be reused in the next cycle of operation.

At the same time compressed air is introduced through air-control valve 31 to assist in withdrawing the fluid plastic, to prevent the walls of the molded article from collapsing and to assist in cooling the mold. The material withdrawn from the mold is employed on the next stroke of the piston 56. The supply of plastic in the feed chamber 49 is replenished by valve 78, cutting off communication with mold 77 and establishing communication with plasticizer chamber 22 so that additional plastic to supplement that previously withdrawn from the mold may be drawn down from the plasticizer 22 through conduit 46 as the piston 56 completes its return stroke.

Although the foregoing invention has been described in some detail by way of illustration and example for purposes of clarity of understanding, it is understood that certain changes and modifications may be practiced within the spirit of the invention and scope of the appended claims.

What is claimed is:

1. Apparatus for molding a hollow plastic object, comprising a mold having a cavity, a plasticizing chamber, a feed chamber, said feed chamber maintaining its contents free from contact with ambient atmosphere, first means for transmitting plasticized material from said plasticizing chamber to said feed chamber, second means for transmitting plasticized material in both directions between said feed chamber and said mold, valve means controlling movement of plasticized material through said first and second means, a piston in said feed chamber, said piston being reciprocable in said feed chamber, and an air nozzle for actuating said valve means and said piston.

2. Apparatus according to claim 1, which further comprises means for injecting compressed air into said mold.

3. Apparatus according to claim 2, which further comprises timing means for first moving said valve means to open said first means and close said second means, while retracting said piston, second moving said valve means to close said first means and open said second means while advancing said piston, and third for closing said first means and opening said second means while retracting said piston and opening said air nozzle.

4. Apparatus according to claim 1, which further comprises means for maintaining said plasticizer chamber and feed chamber at elevated temperature and said mold at reduced temperature.

5. A system for continuously forming hollow plastic articles in a two-piece mold maintained at a relatively low temperature by solidifying the plastic material contacting the interior surfaces of the mold comprising, in combination, a charging chamber cooperating with the mold; a source of liquid plastic; valve means controllable to provide a passageway between said source and the charging chamber in one position and between the interior of the mold and the charging chamber in the other position; means to force the plastic of said source into said charging chamber whenever said valve is in said one position; plastic control means cyclically operable to control the passage of plastic between the mold and the charging chamber when said valve is in said other position; first timing means having a preselected timing interval and controllable by said plastic control means to initiate the opening of the mold and ejection of a completed plastic article therefrom and to thereafter close the mold; second timing means responsive to the closure of said mold to initiate a timing cycle; means responsive to said cycle to shift said valve to said other position and cause said plastic control means to force plastic into said mold; means responsive to a preselected pressure in said mold to stop the flow of plastic into said mold; further means responsive to said cycle to force air into the interior of said mold and cause the plastic control means to withdraw still liquid plastic from the mold; and means responsive to the disablement of said second timing means to shift the valve control means to said one position prior to the reoperation of said plastic control means.

6. A system for continuously forming hollow plastic articles in a two-piece mold maintained at a relatively low temperature by solidifying the plastic material contacting the interior surfaces of the mold comprising, in combination, a charging cylinder cooperating with the two-piece mold and having a piston supported therein for longitudinal movement between extended and retracted positions; a source of liquid plastic; valve means controllable to provide a passageway between said source and the charging cylinder in one position and between the interior of the mold and the charging cylinder in the other position; means to force the plastic of said source into said charging cylinder whenever said valve is in said one position; first timing means having a preselected timing interval; means actuated by said piston each time it reaches said retracted position to enable said first timing means; first means responsive to the enablement of said first timing means to open the mold and eject a completed plastic article therefrom to the disablement of said first timing means to close the mold; second timing means having a plurality of sequential time intervals; means controlled by the closure of said mold to enable said second timing means; second means responsive to the first interval of said second timing means to cause said valve to assume said other position and third means responsive to said first interval to cause said piston to move toward its extended position to force liquid plastic from said charging cylinder into the mold; means for detecting the pressure of the plastic in said mold; means responsive to a preselected pressure to interrupt the movement of said piston; a source of air; means responsive to the second interval of said second timing means to connect said source of air to the interior of said mold and to cause said third means to move the piston toward its retracted position so that the source of air can force the still liquid plastic in the mold back into the charging cylinder; means responsive to a third interval of said second timing means to disable said third means thereby stopping the movement of said piston toward its retracted position; and means responsive to the disablement of said second timing means to reoperate said third means, disable said second means in order to return said valve to said one position so that additional plastic may flow into said charging cylinder and to disconnect the source of air from the interior of said mold.

7. A system for continuously forming hollow plastic articles in a two-piece mold maintained at a relatively low temperature by solidifying the plastic material contacting the interior surfaces of the mold comprising, in combination, a charging cylinder cooperating with the two-piece mold and having a piston supported therein for longitudinal movement between extended and retracted positions, a plasticizer chamber, a two-position valve controllable to provide a passageway between the plasticizer chamber and the charging cylinder in one position and between the interior of the mold and the charging cylinder in its other position, a source of fluid plastic in said plasticizer chamber, means cooperating with said plasticizer chamber to force the plastic into said charging cylinder whenever said valve is in one position, first timing means having a preselected timing interval, means responsive to said piston each time it reaches said retracted position to enable said first timing means, first means responsive to the enablement of said first timing means to open said mold and eject a completed plastic article therefrom and after the timing out of its time interval and the disablement of the first timing means to close the mold, second and third timing means operable to time out preselected and equal timing intervals; the interval of said third timing means being divided into first, second and third sub-intervals; means controlled by the closure of said mold to enable said second and third timing means, second means responsive to the start of said second timing means to cause said valve to assume said other position, third means responsive to the start of said third timing means to cause said piston to move toward its extended position to thereby force liquid plastic from said charging cylinder into the mold cavity, means for detecting the pressure opposing the flow of plastic into said mold, means responsive to a preselected opposing pressure to stop the instant movement of said piston, a source of air, fourth timing means having a timing interval equal to the second and third sub-intervals of said third timing means and operable to connect said source of air to the interior of said mold, the beginning of said second sub-interval of said third timing means operable to enable the fourth timing means and to cause said third means to move the piston toward its retracted position so that the source of air can force the still liquid plastic in the mold back into the charging cylinder, a source of plastic pellets, fourth means responsive to the enablement of the fourth timing means to meter a preselected number of the pellets from said source to said plasticizer chamber, and means responsive to the third sub-interval of said third timing means to stop the movement of said piston toward its retracted position until said second, third and fourth timing means time out and become disabled, said second means responsive to the disablement of said second timing means to return said valve to said one position so that additional plastic from the plasticizer chamber may flow into said charging cylinder and the disablement of said fourth timing means disconnecting the source of air from the interior of said mold.

References Cited in the file of this patent

UNITED STATES PATENTS

| | | |
|---|---|---|
| 1,362,978 | Winter | Dec. 21, 1920 |
| 2,136,432 | Gattuso | Nov. 15, 1938 |
| 2,209,877 | Ferngren | July 30, 1940 |
| 2,263,302 | Johnson | Nov. 18, 1941 |
| 2,885,733 | Chupa | May 12, 1959 |

FOREIGN PATENTS

| | | |
|---|---|---|
| 299,340 | Great Britain | Oct. 22, 1928 |
| 567,805 | Great Britain | Mar. 5, 1945 |